United States Patent [19]

Frykhult

[11] Patent Number: 5,296,152
[45] Date of Patent: Mar. 22, 1994

[54] APPARATUS FOR FILTERING SUSPENSIONS AND A METHOD OF OPERATING THE APPARATUS

[75] Inventor: Rune Frykhult, Stockholm, Sweden

[73] Assignee: Ingenjorsfirman R. Frykhult AB, Sweden

[21] Appl. No.: 861,980

[22] PCT Filed: Feb. 18, 1991

[86] PCT No.: PCT/SE91/00110
§ 371 Date: Jun. 30, 1992
§ 102(e) Date: Jun. 30, 1992

[87] PCT Pub. No.: WO91/12063
PCT Pub. Date: Aug. 22, 1991

[30] Foreign Application Priority Data

Feb. 16, 1990 [SE] Sweden .............. 9000569-5
Feb. 16, 1990 [SE] Sweden .............. 9000571-1

[51] Int. Cl.$^5$ ............................ B01D 33/21
[52] U.S. Cl. ...................... 210/780; 210/327; 210/331; 210/347
[58] Field of Search ............... 210/327, 331, 345, 346, 210/347, 359, 402, 403, 404

[56] References Cited

U.S. PATENT DOCUMENTS

| 4,123,363 | 10/1978 | Koskinen | 310/33 |
| 4,255,264 | 3/1981 | Madsen | 210/404 |
| 4,330,405 | 5/1982 | Davis et al. | 210/331 |
| 4,728,424 | 3/1988 | Miura | 210/331 |
| 4,814,093 | 3/1989 | Frykhult | 210/331 |

FOREIGN PATENT DOCUMENTS 433571 6/1984 Sweden .
2178973 2/1987 United Kingdom .

Primary Examiner—Robert A. Dawson
Assistant Examiner—David Reifsnyder
Attorney, Agent, or Firm—Mason, Fenwick & Lawrence

[57] ABSTRACT

A disk filter for filtering mat forming suspensions is provided with a hollow shaft for receiving a flow of fine fraction created by hydrostatic pressure difference between the suspension to be filtered and the fine fraction in the hollow shaft. According to the invention, each disc is provided with a number of fine fraction chambers communicating with the interior of the hollow shaft via respective holes in the circumferential wall of the shaft. Each chamber is arranged, such that it functions as a dropleg during movement upwards, with the result that the coarse particle (fibre) concentration of the created coarse fraction is increased.

8 Claims, 2 Drawing Sheets

APPARATUS FOR FILTERING SUSPENSIONS AND A METHOD OF OPERATING THE APPARATUS

BACKGROUND OF THE INVENTION

1. Field of the Invention

The present invention relates to an apparatus for filtering mat forming suspensions, such as fibre pulp suspensions, and a method of operating such an apparatus.

2. Description of the Prior Art

The expression "mat forming suspensions" is used to mean the kind of suspension which leaves a porous mat of course particles on a filter material when passing through the filter material. The mat of particles gradually becomes thicker and as a result becomes less pervious by liquid during the filtering operation. Therefore, the mat must be regularly removed from the filter material, in order to provide optimal filtering efficiency.

One method of removing the mat from the filter material is to raise repeatedly the filter material up above a pool of the suspension to be filtered, so that the mat falls off by gravity provided that the mat contains a sufficient amount of liquid. In other words, the course particle concentration of the mat must be relatively low. In this case, the filtering operation is normally accomplished by providing a hydrostatic pressure difference between the suspension to be filtered and the created fine fraction of the suspension. Devices for carrying out filtering processes in this manner are hereafter called hydrostatic filtering apparatuses.

Another method of removing the mat is to spray jets of liquid on the filter material, while the latter is positioned above the pool of suspension, so that the mat is stripped off the filter material in pieces. This method is used in such filtering processes in which the course particle concentration of the mat is increased by subjecting the fine fraction side of the filter material to vacuum. Devices for carrying out filtering processes in this manner are known as vacuum filtering apparatuses.

There is a known type of hydrostatic filtering apparatus for filtering mat forming suspensions, such as fibre pulp suspensions, comprising a container for the suspension to be filtered, inlet means for supplying a suspension to the container, a hollow rotatable horizontal shaft with a circumferential wall extending in the container, and means for rotating the hollow shaft. At least one annular, substantially vertical hollow filter disc with two opposed side walls of filter material is mounted on said circumferential wall concentrically with the shaft. The circumferential wall has holes for providing communication between the interior of the hollow filter disc and the interior of the hollow shaft. Means is provided for controlling the volume of the suspension in the container during operation, such that the side walls of filter material are partly above the suspension in the container, while the hollow shaft is at least partly submerged in the suspension in the container. Thus, the gas pressure on the suspension in the container is substantially equal to the gas pressure prevailing in the hollow shaft. During operation, a fine fraction of the suspension is forced through the side walls of filter material into the hollow filter disc and further into the hollow shaft via said holes by hydrostatic pressure in the suspension in the container, and a course fraction of the suspension is created outside the filter disc. There are provided fine fraction discharge means for discharging said fine fraction of the suspension from the interior of the hollow shaft, and course fraction discharge means for discharging said course fraction of the suspension from the apparatus.

This type of hydrostatic filtering apparatus is of a simple and inexpensive design, and is particularly used for dewatering fibre pulp suspensions in connection with processes for producing paper. However, a drawback to this filtering apparatus is the poor utilization of the filter material submerged in the suspension caused by the relatively liquid impervious mat of fibres, which is rapidly formed on the filter material during operation. The fact is that about two thirds of the created fine fraction of the suspension is achieved through the filter material at the down-moving part of the filter disc, where the mat in an average sense is relatively thin, whereas only about one third of the fine fraction is achieved through the filter material at the up-moving part of the filter disc, where the mat is thick.

Another drawback to this type of hydrostatic filtering apparatus is that the latter is incapable of producing dewatered thickened fibre pulp suspensions having a fibre concentric exceeding about 3%, which makes the use of this filtration apparatus impossible in many filtering applications in the paper making industry.

Filtering processes for producing thickened fibre pulp suspensions having a fibre concentration exceeding 3% are conventionally carried out by means of the above-mentioned vacuum filtering apparatuses. However, such a vacuum filtering apparatus is much more complicated to fabricate and install compared with a hydrostatic filtering apparatus, which considerably adds to the costs. Thus, a vacuum filtering apparatus is normally provided with at least one dropleg having a height of about 7 meters for providing the vacuum required. This dropleg arrangement has the consequence that the consumption of pump energy of the apparatus is relatively high, since the fine fraction of the suspension must be pumped the corresponding height of the dropleg. In addition to this, such a dropleg gives rise to increased mixing of air in the fine fraction of the suspension, which has the drawback of reducing the capacity of subsequent fibre pulp treating machinery.

SUMMARY OF THE INVENTION

An object of the present invention is to provide a new filtering apparatus of the hydrostatic type, which has an improved capacity per filter material unit.

Another object of the present invention is to provide a new filtering apparatus of the hydrostatic type which is capable of producing higher course particle concentration of the course fraction of the suspension, as compared with prior art hydrostatic filtering apparatuses.

A further object of the present invention is to provide a suitable method of operating the new apparatus for achieving high course particle concentration of the course fraction of the suspension.

These objects are fulfilled by a filtering apparatus of the hydrostatic type defined-above, which further comprises partition walls extending between said opposed walls of the filter disc and positioned so as to divide the interior of the filter disc into a number of chambers disposed in series around the filter disc, the chambers communicating with the interior of the hollow shaft through the holes in the circumferential wall of the hollow shaft, such that each hole constitutes an outlet for discharging fine fraction from one of the chambers of the filter disc, means for maintaining a pool of fine fraction in the hollow shaft, said partition walls being arranged, such that each chamber is at least partly above said pool of fine fraction in the shaft at some point of the revolution of the filter disc at the up-moving part of the filter disc, while said fine fraction outlet of the chamber opens into said pool of fine fraction.

Each chamber functions as a dropleg at the up-moving part of the filter disc, when at least a part of the chamber is above the pool of fine fraction in the shaft, while the outlet of the chamber opens into said pool, so that a negative pressure is created in the chamber. Thus, the pressure difference between the outside and the inside of the chamber at said point of revolution of the filter disc is increased by the created negative pressure in the chamber, and consequently, the flow of fine fraction through the filter material of the chamber is increased. Also, a more compressed mat of course particles is formed on the filter material of the chamber because of said increased pressure difference, with the result that the course particle concentration of the course fraction of the suspension is increased.

The present invention also relates to a method of operating the new apparatus, comprising rotating the filter disc in a speed such that each chamber still contains a volume of fine fraction, when at least a part of the chamber has been displaced up above the suspension in the container. This has the consequence that fine fraction is sucked from mat being above the suspension, resulting in the advantage that the course particle concentration of the course fraction is further increased.

According to a preferred embodiment of the new apparatus, said partition walls are arranged, such that each chamber is at least partly above the suspension in the container at some point of the revolution of the filter disc at the up-moving part of the filter disc, while said fine fraction outlet of the chamber opens into said pool of fine fraction. This has the advantage that, irrespectively of the rotational speed the filter disc, fine fraction is sucked from the mat above the suspension in the container during operation, which increases the course particle concentration of the course fraction of the suspension.

Advantageously, the partition walls extend from the hollow shaft forwards in the direction of rotation of the filter disc for providing a high column of fine fraction in each chamber and a corresponding high negative pressure therein, when the chamber is displaced upwards during operation.

DETAILED DESCRIPTION OF THE INVENTION

Figure 1:
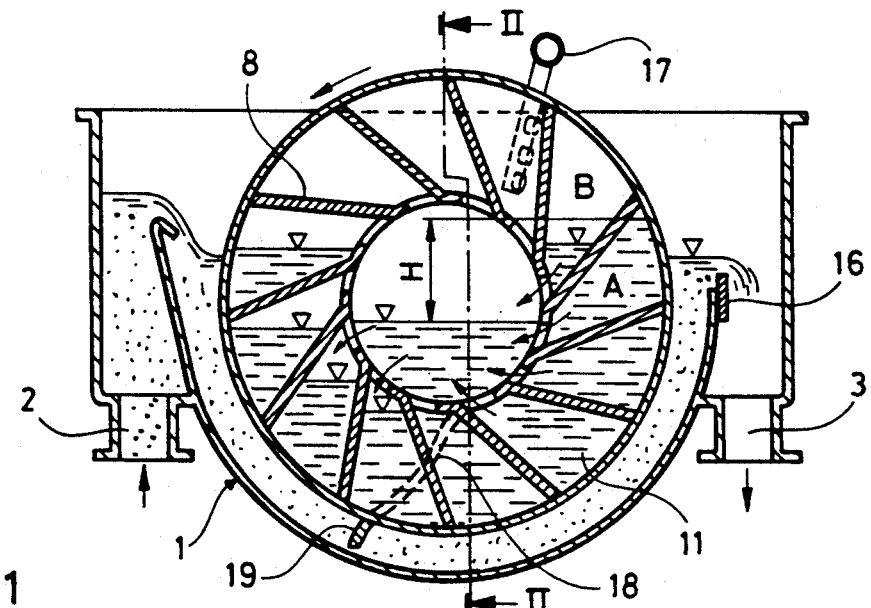
FIG. 1 is a vertical cross-section of an embodiment of the filtering apparatus of the invention.
Figure 2:
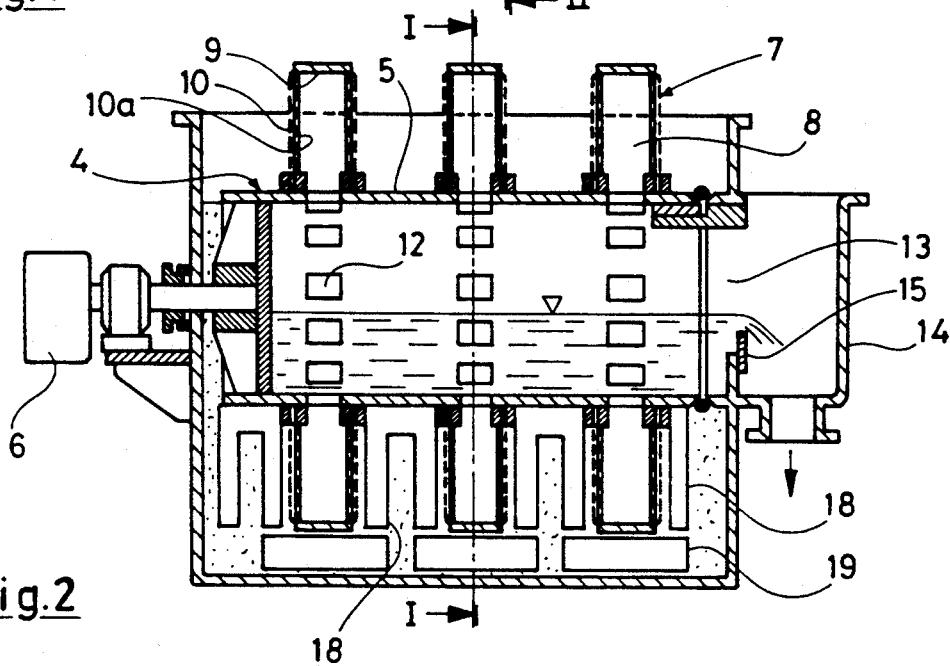
FIG. 2 is a longitudinal cross-section taken along line 11—11 of FIG. 1.

The filtering apparatus shown in FIGS. 1 and 2 comprises a container 1 with an inlet pipe 2 for the suspension to be filtered at one side of the container 1, and an outlet pipe 3 for thickened suspension, i.e. created course fraction, at the opposite side of the container 1. A circular cylindrical drum shaft 4 with a circumferential wall 5 extends horizontally in the container 1 and is journalled on the latter. The internal diameter of the hollow shaft 4 is 1.6 meters (normally 1-2 m.) A drive motor 6 at one end of the shaft 4 is arranged to rotate the shaft 4.

Three hollow annular filter discs 7, each having a diameter of 4 meters, (normally 3-5.5 m.) are vertically mounted on the shaft 4. The discs 7 are spaced from each other and situated concentric with the shaft 4. Each filter disc 7 comprises twelve partition walls 8, an outer peripheral wall 9, and two opposed side walls 10 of filter material, such as cloth or felt, supported by two liquid pervious wall members 10a. The partition walls 8 extend from the hollow shaft 4 forwards in the direction of rotation of the filter discs 7 dividing the interior of each filter disc 7 into twelve chambers 11 located in series around the filter disc 7. The chambers 11 communicate with the interior of the hollow shaft 4 via holes 12, respectively, in the circumferential wall 5.

Opposite the drive motor 6, the hollow shaft 4 has an open end, at which the circumferential wall 5 is sealingly journalled on the wall of the container 1 around a hole 13 in the latter. The interior of the hollow shaft 4 communicates via said open end of the shaft 4 and the hole 13 with the interior of a fine fraction outlet member 14 arranged on the outside of the container 1. There is an adjustable overflow member 15 on the wall of the container 1 at the hole 13 for providing a pool of fine fraction in the hollow shaft 4.

An adjustable overflow member 16 for controlling the volume of the suspension in the container 1 is arranged on the walls of the container 1 at the outlet pipe 3 for thickened suspension.

Spray nozzle means 17 is arranged at each side of each filter disc 7 for spraying high pressure jets of liquid against the formed mat of course particles, so that the mat is loosened from the filter material and drop to the suspension in the container 1. There is an entrainment member 18 on each side of each filter disc 7 extending from the hollow shaft 4 backwards in direction of rotation of the filter discs 7 for entraining thickened suspension in the container 1 radially outwards and circumferentially forwards to the overflow member 16. Each filter disc 7 is also provided with an entrainment member 19 on the peripheral wall 9 for entraining thickened suspension from the vicinity of the wall of the container 1 to the overflow member 16.

An important field of use of the apparatus of the invention is for dewatering fibre pulp suspensions and, therefore, the operation of the apparatus shown in FIGS. 1 and 2 will be described in the following in connection with dewatering of a fibre pulp suspension.

A fibre pulp suspension to be dewatered having a fibre concentration of typically 0.6% is supplied to the container 1 through the inlet-pipe 2. The surface of the suspension in the container 1 is adjusted by means of the overflow member 16, so that the side walls 10 of filter material, which cover the chambers 11 being at the top of the filters discs, are above the suspension. The shaft 4 is rotated by the drive motor 6 in a direction, such that the parts of the filter discs 7 which are located next to the inlet pipe 2 are displaced downwards, while the parts of the filter discs which are located next to the overflow member 16 at the outlet member 3 are displaced upwards. The hydrostatic pressure in the suspension in the container 1 causes a fine fraction of the suspension, mainly containing water, to pass through the side walls 10 of filter material into the chambers 11. The fine fraction so created flows from the chambers 11 via the holes 12 of the circumferential wall 5 into the hollow shaft 4. A pool of fine fraction is maintained in the hollow shaft 4 by means of the overflow member 15, over which fine fraction passes and then is discharged via the fine fraction outlet member 14. The overflow member 15 is adjusted, such that a hydrostatic pressure difference high enoug is maintained between the suspension in the container 1 and the pool of fine fraction in the hollow shaft 4.

In the suspension in the container 1, a porous mat of fibres is created on the side walls 10 of filter material. The mat becomes thicker and more liquid impervious during the movement of the side walls 10 through the suspension. As a chamber 11 is in the three o'clock position noted by the reference numeral A in FIG. 1, this chamber 11 has raised its content of fine fraction substantially up above the pool of fine fraction in the hollow shaft 4, so that a negative pressure corresponding to the head H of the operating fine fraction in the chamber 11 is created in the chamber 11. The hole 12 of this chamber 11 constituting an outlet for the fine fraction opens into the pool of fine fraction, thereby preventing air from entering the chamber 11 from the hollow shaft 4. Said created negative pressure increases the flow of fine fraction into chamber 11 and gives rise to a tighter (or in other words: less water containing) mad of fibres.

As a chamber 11 has moved partly up above the suspension in the container 1 to the two o'clock position noted by the reference numeral B in FIG. 1, there is still an amount of fine fraction left in the chamber, because of the high rotational speed of the filter discs, so that a negative pressure is created in the chamber 11 sucking fine fraction out of the mat of fibres into the chamber 11 and air into the mat. Some air will bubble into this chamber 11 through the outlet hole 12 of the chamber 11 reducing, but not entirely, the created negative pressure in said chamber 11.

The mat of fibres is disintegrated into loose clumps of fibres by water jets from the spray nozzle means 17, and said clumps of fibres drop from the side walls 10 into the suspension in the container 1. The thickened suspension containing said clumps of fibres is entrained by means of the entrainment members 18, 19 over the overflow member 16 to the outlet pipe 3. The thickened fibre pulp suspension leaving the apparatus through the outlet pipe 3 constitutes the created course fraction of the suspension, which in this case may have a fibre concentration up to about 5%, possibly more.

Figure 3:
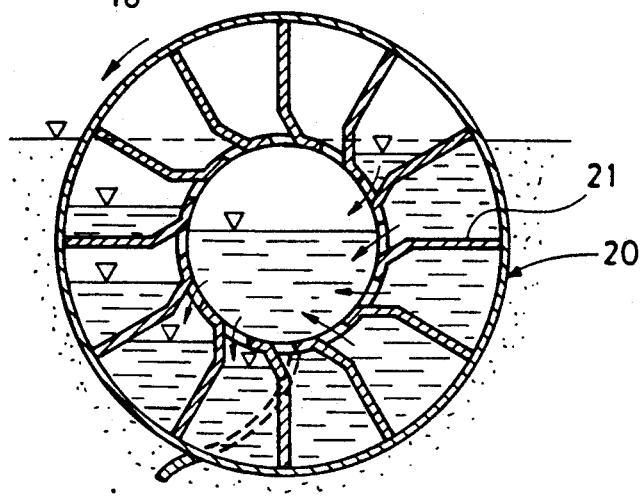
FIG. 3 is a vertical cross-section of a modification of a filter disc for the filtering apparatus shown in FIG. 1.

The filter disc 20 shown in FIG. 3 is of identical construction to the filter disc 7 shown in FIGS. 1 and 2, except that its partition walls 21 extend substantially radially. The disc 20 may be used in the apparatus shown in FIGS. 1 and 2 if the requirement on the fibre concentration of the course fraction is lower than about 5%. Instead, the apparatus of FIGS. 1 and 2 equipped with filter discs 20 may be operated in a higher rotational speed resulting in an increased capacity. The reason for this is that the chambers between the radial partition walls 21 can be emptied of fine fraction in a shorter time than that of the chambers 11 of the disc 7.

In most filtering applications, the filtering apparatus would be operated optimally and would be substantially insensible to changes in operational parameters (such as feed flow, freeness and consistency), if the volume of the chambers would be larger than required for the feed flow of the suspension to be filtered. To achieve this the filter disc can be modified by increasing the distance between the opposed side walls of filter material, such that the volume of each chamber is increased. During operation of an apparatus equipped with such a modified filter disc, the chambers at the down-moving part of the filter disc are only partly filled with fine fraction from the suspension in the container, as illustrated in FIG. 3. However, fine fraction flows backwards from the pool of fine fraction into the lowest chambers filling the latter. The result is that the chambers at the up-moving part of the filter disc contain a larger volume of fine fraction than that of a non-modified filter disc. This means that the duration of the negative pressure created in each chamber, when this rises over the pool of fine fraction in the hollow shaft, is prolonged. Thus, the fibre concentration of the course fraction is increased, since the mat of fibres above the suspension is dewatered more efficiently.

The filtering apparatus shown in FIGS. 4 to 6 comprises a container 22, an inlet pipe 23, a hollow shaft with a circumferential wall 24, hollow filter discs 25, twelve partition walls 26 in each filter disc 25 dividing the interior of the filter disc 25 into twelve fine fraction chambers 27, and fine fraction outlet holes 28 in the circumferential wall 24, all the above mentioned components located in like manner to the analogous components described in connection with the apparatus shown in FIGS. 1 and 2. The difference between the apparatus shown in FIGS. 4 to 6 and the apparatus described-above in connection with FIGS. 1 and 2 principally lies in the design of the chambers 27 and the manner in which the created course fraction is discharged from the apparatus.

Each partition wall 26 is bent forward in the direction of rotation of the filter discs 25 to form two straight wall portions, one radially inner wall portion 26a and one radially outer wall portion 26b. The outer wall portion 26b is at an angle to the inner wall portion 26a. (As an alternative, each partition wall 26 may be steplessly curved forward in the direction of rotation). With the partition walls 26 so designed, a very high negative pressure is obtained in the chamber 27, as this is at the two o'clock position noted by the reference numeral C in FIG. 4. In this position, the negative pressure in the chamber 27 corresponds to the head H of the operating fine fraction column in the chamber 27.

Figure 7:
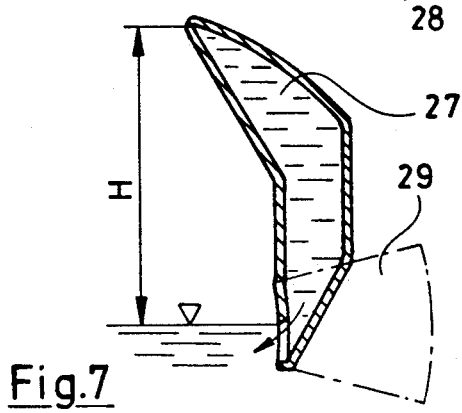
FIG. 7 is a vertical cross-section of a chamber for the filtering apparatus shown in FIG. 4.

A comparison between the chamber 27 and another chamber 29 formed between radial partition walls is illustrated in FIG. 7. From this it can be seen that the head H of the fine fraction in chamber 27 is about four times higher than that of the fine fraction in chamber 29. Thus, the negative pressure in chamber 27 is about four times higher than that of chamber 29.

Figure 4:
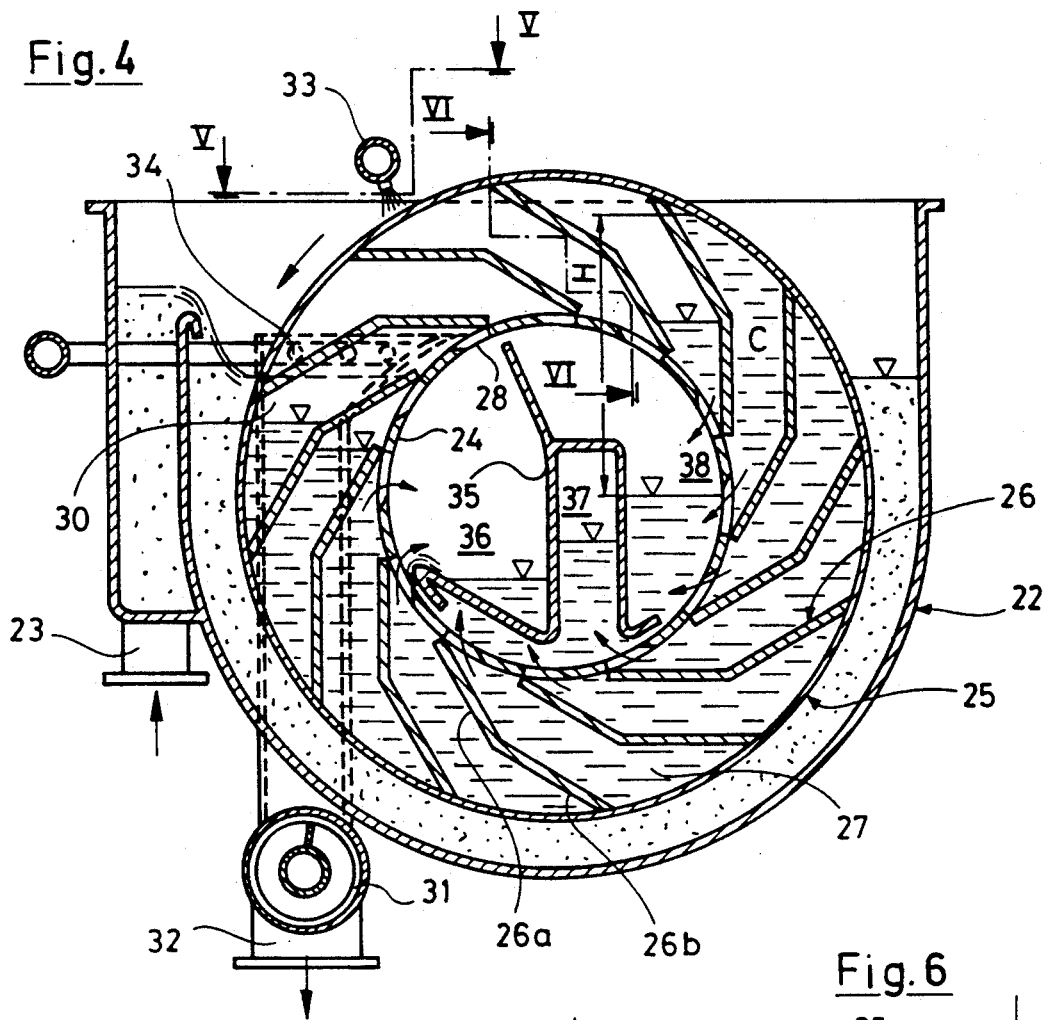
FIG. 4 is a vertical cross-section of a preferred embodiment of the filtering apparatus of the invention.
Figure 5:
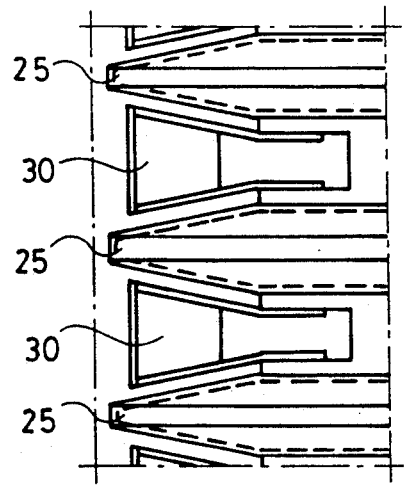
FIG. 5 is a part of a view from above along line V—V of FIG. 4.
Figure 6:
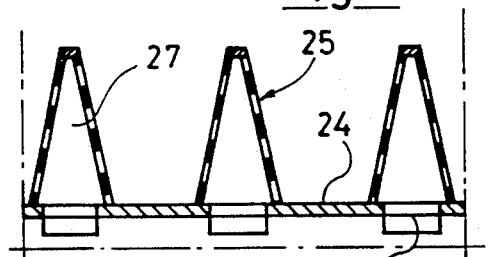
FIG. 6 is a part of a sectional view along line VI—VI of FIG. 4.

When operating the apparatus according to FIGS. 4 to 6 for a fibre pulp suspension, said high negative pressure created in the chambers 27 will dewater the mat of course particles to the extent, that each side wall of filter material of each chamber 27 will be covered with a coherent cake of fibres. Such cakes of fibres do not disintegrate when they are removed from the walls of the chambers 27, which can give rise to clogging and stoppage of the apparatus. Therefore, vertical chutes 30 are arranged at the sides of the filter discs 25 at the down-moving part of the filter discs 25 for receiving loosened cakes. The chutes 30 are united by a horizontal screw conveyor 31 for conveying the cakes to a common discharge pipe 32.

Spray nozzles 33 are arranged at the radially outer ends of the filter discs 25 above the chutes 30 for directing high pressure jets of water against the joints between the fibre cakes and the side walls of filter material for rolling off the cakes, so that the cakes drop into the chutes. To facilitate the the cake removal operation, the filter material on each side of each chamber 27 may be provided with a number of water impervious strip formed zones extending between adjacent partition walls, with the effect that a number of small separate pieces of fibre cakes are formed on each side wall of the chambers 27. There are also spray nozzles 34 for cleaning the filter material before the latter moves down into the suspension.

The desired surface level of the suspension in the container 22 is maintained by controlling the rotational speed of the filter discs 25.

A stationary wall member 35 which is spaced from the circumferential wall 24, extends axially through the hollow shaft and divides the interior of the hollow shaft into a cloudy filtrate space 36, a clear filtrate space 37, and an ultra-clear filtrate space 38, numbered in said order in the direction of rotation of the filter discs 25. Filtrate space 36 receives cloudy filtrate from about two down-moving chambers 27, on which the mat of fibres is relatively thin. Filtrate space 37 receives clear filtrate from about three chambers 27 being ahead of said down-moving chambers 27 and covered with a relatively thick mat of fibres. Filtrate space 37 receives ultra clear filtrate from three up-moving chambers 27, on which the mat of fibres is still thicker. Three overflow members (not shown) maintain the three various fractions of filtrate at various levels, such that the head of the ultra-clear filtrate is higher than the head of the clear filtrate, and the latter is higher than the head of the cloudy filtrate. The positive consequence is that a filtrate cannot leak in the direction of rotation of the discs between the wall member 35 and the circumferential wall 24.

The filtering apparatus according to FIGS. 4 to 6 is capable of producing thickened fibre suspensions having a fibre concentration of up to 9%.

I claim:

1. An apparatus for filtering mat forming suspensions, such as fiber pulp suspensions, comprising:
    a container for the suspension to be filtered;
    an inlet means for supplying a suspension to the container;
    a hollow rotatable horizontal shaft with a circumferential wall extending in the container, the shaft being journaled on the container, the interior of the hollow shaft being in fluid communication with the atmosphere;
    means for rotating the hollow shaft;
    at least one annular, substantially vertical hollow filter disc with two opposed side walls of filter material, the filter disc being mounted on the circumferential wall concentric with the shaft, the circumferential wall having holes for providing communication between the interior of the hollow filter disc and the interior of the hollow shaft;
    means for controlling the volume of the suspension in the container during operation to maintain the volume of the suspension partly below the side walls of filter material, and to maintain the hollow shaft at least partly submerged in the suspension in the container whereby the gas pressure on the suspension in the container is substantially equal to the gas pressure prevailing within the entire hollow shaft, and whereby a fine fraction of the suspension is forced through the side walls of filter material into the hollow filter disc and further into the hollow shaft via the holes by hydrostatic pressure in the suspension in the container, and a course fraction of the suspension being created outside the filter disc;
    fine fraction discharge means for discharging the fine fraction of the suspension from the interior of the hollow shaft;
    course fraction discharge means for discharging the course fraction of the suspension from the apparatus;
    partition walls extending between the opposed side walls of the filter disc and positioned to divide the interior of the filter disc into a number of chambers disposed in series around the filter disc, the chambers communicating with the interior of the hollow shaft through the holes in the circumferential wall of the hollow shaft, each hole constituting an outlet for discharging fine fraction from one of the chambers of the filter disc; and
    means for maintaining a pool of fine fraction in the hollow shaft, the partition walls being arranged so each chamber is at least partly above the pool of fine fraction in the shaft at some point of the revolution of the filter disc at the upwardly moving part of the filter disc, while the fine fraction outlet of the chamber opens into the pool of fine fraction.

2. An apparatus according to claim 1, wherein the partition walls are arranged, such that each chamber is at least partly above the suspension in the container at some point of the revolution of the filter disc at the up-moving part of the filter disc, while the fine fraction outlet of the chamber opens into the pool of fine fraction.

3. An apparatus according to claim 2, wherein course particles form a mat on the parts of the side walls of the filter material which are above the suspension in the container during operation, the course fraction discharge means comprising spray nozzle means for removing the mat of course particles from the parts of the side walls of filter material.

4. An apparatus according to claim 3, wherein the inlet means is located at the down-moving part of the filter disc, and the course fraction discharge means comprises an outlet member for discharging course fraction from the container at the up-moving part of the filter disc.

5. An apparatus according to claim 3, wherein the course fraction discharge means comprises a chute member for receiving the removed mat of course particles for discharging the latter from the apparatus.

6. An apparatus for filtering mat forming suspensions, such as fiber pulp suspensions, comprising:
    a container for the suspension to be filtered;
    an inlet means for supplying a suspension to the container;

a hollow rotatable horizontal shaft with a circumferential wall extending in the container, the shaft being journaled on the container, the interior of the hollow shaft being in fluid communication with the atmosphere;

means for rotating the hollow shaft;

at least one annular, substantially vertical hollow filter disc with two opposed side walls of filter material, the filter disc being mounted on the circumferential wall concentric with the shaft, the circumferential wall having holes for providing communication between the interior of the hollow filter disc and the interior of the hollow shaft;

means for controlling the volume of the suspension in the container during operation to maintain the volume of the suspension partly below the side walls of filter material, and to maintain the hollow shaft at least partly submerged in the suspension in the container, whereby the gas pressure on the suspension in the container is substantially equal to the gas pressure prevailing within the entire hollow shaft, and whereby a fine fraction of the suspension is forced through the side walls of filter material into the hollow filter disc and further into the hollow shaft via the holes by hydrostatic pressure in the suspension in the container, and a course fraction of the suspension being created outside the filter disc;

fine fraction discharge means for discharging the fine fraction of the suspension from the interior of the hollow shaft;

course fraction discharge means for discharging the course fraction of the suspension from the apparatus;

partition walls extending between the opposed side walls of the filter disc and positioned to divide the interior of the filter disc into a number of chambers disposed in series around the filter disc, the chambers communicating with the interior of the hollow shaft through the holes in the circumferential wall of the hollow shaft, each hole constituting an outlet for discharging fine fraction from one of the chambers of the filter disc, the partition walls being arranged so each chamber is at least partly above the suspension in the container at some point of the revolution of the filter disc at the upwardly-moving part of the filter disc, while the fine fraction outlet of the chamber opens into the pool of fine fraction, wherein each partition wall is bent forward in the direction of rotation of the filter disc; and means for maintaining a pool of fine fraction in the hollow shaft, the partition walls being arranged so each chamber is at least partly above the pool of fine fraction in the shaft at some point of the revolution of the filter disc at the upwardly-moving part of the filter disc, while the fine fraction outlet of the chamber opens into the pool of fine fraction.

7. An apparatus for filtering mat forming suspensions, such as fiber pulp suspensions, comprising:

a container for the suspension to be filtered;

an inlet means for supplying a suspension to the container;

a hollow rotatable horizontal shaft with a circumferential wall extending in the container, the shaft being journaled on the container, the interior of the hollow shaft being in fluid communication with the atmosphere;

means for rotating the hollow shaft;

at least one annular, substantially vertical hollow filter disc with two opposed side walls of filter material, the filter disc being mounted on the circumferential wall concentric with the shaft, the circumferential wall having holes for providing communication between the interior of the hollow filter disc and the interior of the hollow shaft;

means for controlling the volume of the suspension in the container during operation to maintain the volume of the suspension partly below the side walls of filter material, and to maintain the hollow shaft at least partly submerged in the suspension in the container, whereby the gas pressure on the suspension in the container is substantially equal to the gas pressure prevailing within the entire hollow shaft, and whereby a fine fraction of the suspension is forced through the side walls of filter material into the hollow filter disc and further into the hollow shaft via the holes by hydrostatic pressure in the suspension in the container and a course fraction of the suspension being created outside the filter disc;

fine fraction discharge means for discharging the fine fraction of the suspension from the interior of the hollow shaft;

course fraction discharge means for discharging the course fraction of the suspension from the apparatus;

partition walls extending between the opposed side walls of the filter disc and positioned to divide the interior of the filter disc into a number of chambers disposed in series around the filter disc, the chambers communicating with the interior of the hollow shaft through the holes in the circumferential wall of the hollow shaft, each hole constituting an outlet for discharging fine fraction from one of the chambers of the filter disc, the partition walls being arranged so each chamber is at least partly above the suspension in the container at some point of the revolution of the filter disc at the upwardly-moving part of the filter disc, while the fine fraction outlet of the chamber opens into the pool of fine fraction, wherein each partition wall is bent forward in the direction of rotation of the filter disc to form two straight wall portions, one radially inner wall portion and one radially outer wall portion, the outer wall portion being at an angle to the inner wall portion; and means for maintaining a pool of fine fraction in the hollow shaft, the partition walls being arranged so each chamber is at least partly above the pool of fine fraction in the shaft at some point of the revolution of the filter disc at the upwardly-moving part of the filter disc, while the fine fraction outlet of the chamber opens into the pool of fine fraction.

8. A method for filtering mat forming suspension comprising:

providing a container for the suspension to be filtered; providing a hollow rotatable horizontal shaft journaled on the container, and at least one annular, substantially vertical hollow filter disc with two opposed side walls of filter material, the filter disc being concentrically mounted on the shaft, the interior of the hollow shaft being in fluid communication with the atmosphere, the shaft having a circumferential wall having holes for providing communication between the interior of the hollow filter disc and the interior of the hollow shaft, the side walls of filter material having partition walls extending therebetween and dividing the interior of the filter disc into a number of chambers disposed in series around the filter disc, the chambers communicating with the interior of the hollow shaft through the holes in the circumferential wall of the hollow shaft and extending at least partly above a pool of fine fraction in the hollow shaft;

controlling the volume of the suspension in the container to maintain the volume of the suspension partly below the side walls of filter material in the container, and to maintain the hollow shaft at least partly submerged in the suspension in the container, whereby the gas pressure on the suspension in the container is substantially equal to the gas pressure prevailing within the entire hollow shaft, thereby forcing a fine fraction of the suspension through the side walls of filter material into the hollow filter disc and further into the hollow shaft via the holes by hydrostatic pressure in the suspension in the container, and creating a course fraction of the suspension outside the filter disc; and rotating the filter disc at a sufficient speed to cause each chamber to contain a volume of fine fraction when at least a part of the chamber has been displaced up above the suspension in the container.

* * * * *